US009090322B2

(12) United States Patent
Nere et al.

(10) Patent No.: US 9,090,322 B2
(45) Date of Patent: Jul. 28, 2015

(54) PROP SHAFT HOLDER FOR OUTBOARD MOTOR

(71) Applicant: Honda Motor Co., Ltd., Tokyo (JP)

(72) Inventors: Chad Nere, Melbourne, FL (US); Marcus Clements, Shreveport, LA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/036,059

(22) Filed: Sep. 25, 2013

(65) Prior Publication Data

US 2014/0087608 A1    Mar. 27, 2014

Related U.S. Application Data

(60) Provisional application No. 61/705,756, filed on Sep. 26, 2012.

(51) Int. Cl.
*B63H 20/14* (2006.01)
*B63H 20/32* (2006.01)
*B63B 1/36* (2006.01)

(52) U.S. Cl.
CPC ............... *B63H 20/14* (2013.01); *B63H 20/32* (2013.01); *B63B 1/36* (2013.01); *Y02T 70/121* (2013.01)

(58) Field of Classification Search
CPC ...................................................... B63H 20/14
USPC .................. 440/66–67, 71, 75; 114/337–338
See application file for complete search history.

(56) References Cited

U.S. PATENT DOCUMENTS

| | | | |
|---|---|---|---|
| 3,788,267 A * | 1/1974 | Strong | 440/66 |
| 4,447,214 A * | 5/1984 | Henrich | 440/66 |
| 5,967,866 A * | 10/1999 | Willows et al. | 440/76 |
| 6,701,862 B2 * | 3/2004 | Hilleman | 114/338 |
| 6,725,797 B2 * | 4/2004 | Hilleman | 114/337 |
| 6,935,908 B2 * | 8/2005 | Garcia | 440/71 |
| 7,029,342 B2 * | 4/2006 | Mallea | 440/41 |
| 7,125,296 B2 * | 10/2006 | Yazaki et al. | 440/75 |
| 7,134,837 B2 * | 11/2006 | Shaw | 415/121.1 |
| 7,229,331 B2 * | 6/2007 | Norman et al. | 440/71 |
| 7,267,589 B2 * | 9/2007 | Norman | 440/67 |
| 2004/0266281 A1 | 12/2004 | Shaw | |
| 2014/0087608 A1 * | 3/2014 | Nere et al. | 440/66 |

* cited by examiner

*Primary Examiner* — Lars A Olson
*Assistant Examiner* — Jovon Hayes
(74) *Attorney, Agent, or Firm* — Rankin, Hill & Clark LLP

(57) ABSTRACT

A prop shaft holder for an outboard motor includes a forward end for engaging a gear casing of the outboard motor and a rearward end axially spaced apart from the forward end. The rearward end includes an inner radial surface for engaging an outer radial surface of a propeller. The prop shaft holder further includes a tapered surface extending from the forward end to the rearward end. The tapered surface includes a surface feature for inducing turbulent flow to water passing thereover.

20 Claims, 4 Drawing Sheets

PROP SHAFT HOLDER FOR OUTBOARD MOTOR

This application claims the benefit of U.S. provisional patent application Ser. No. 61/705,756, filed Sep. 26, 2012, which is incorporated by reference in its entirety herein.

BACKGROUND

A typical propulsion device for an outboard marine motor includes a drive shaft extending vertically within a gear casing and connecting to a crank shaft of an internal combustion engine at an upper end. A drive bevel gear is fixably attached to a lower end of the drive shaft. A propeller shaft extends horizontally adjacent to the lower end of the drive shaft with a pair of driven bevel gears supported coaxially to the propeller shaft in a freely rotatable manner and meshing with the drive bevel gear so as to rotate in mutually opposite directions. A pair of clutch devices engage a selected one of the driven bevel gears with the propeller shaft. A prop shaft holder is secured to a gear casing for supporting and positioning the propeller shaft and a propeller is connected for co-rotation with the propeller shaft.

SUMMARY

According to one aspect, a prop shaft holder for an outboard motor includes a forward end for engaging a gear casing of the outboard motor and a rearward end axially spaced apart from the forward end. The rearward end includes an inner radial surface for engaging an outer radial surface of a propeller. The prop shaft holder further includes a tapered surface extending from the forward end to the rearward end. The tapered surface includes a surface feature for inducing turbulent flow to water passing thereover.

According to another aspect, a prop shaft assembly for a marine application includes a gear casing and a prop shaft holder mounted to the gear casing. The prop shaft holder includes a surface feature for inducing radial separation of water flow thereover. The prop shaft assembly further includes a propeller rotatably secured to the gear casing.

According to a further aspect, a prop shaft holder for an outboard motor in a marine application includes a forward end that engages a gear casing of the outboard motor and a rearward end that engages a propeller operatively connected to the outboard motor for powered rotation thereof. The prop shaft holder further includes a circumferential surface extending between the forward and rearward ends, and having a surface feature thereon for imparting turbulent action to water flowing thereover.

DETAILED DESCRIPTION

Figure 1:
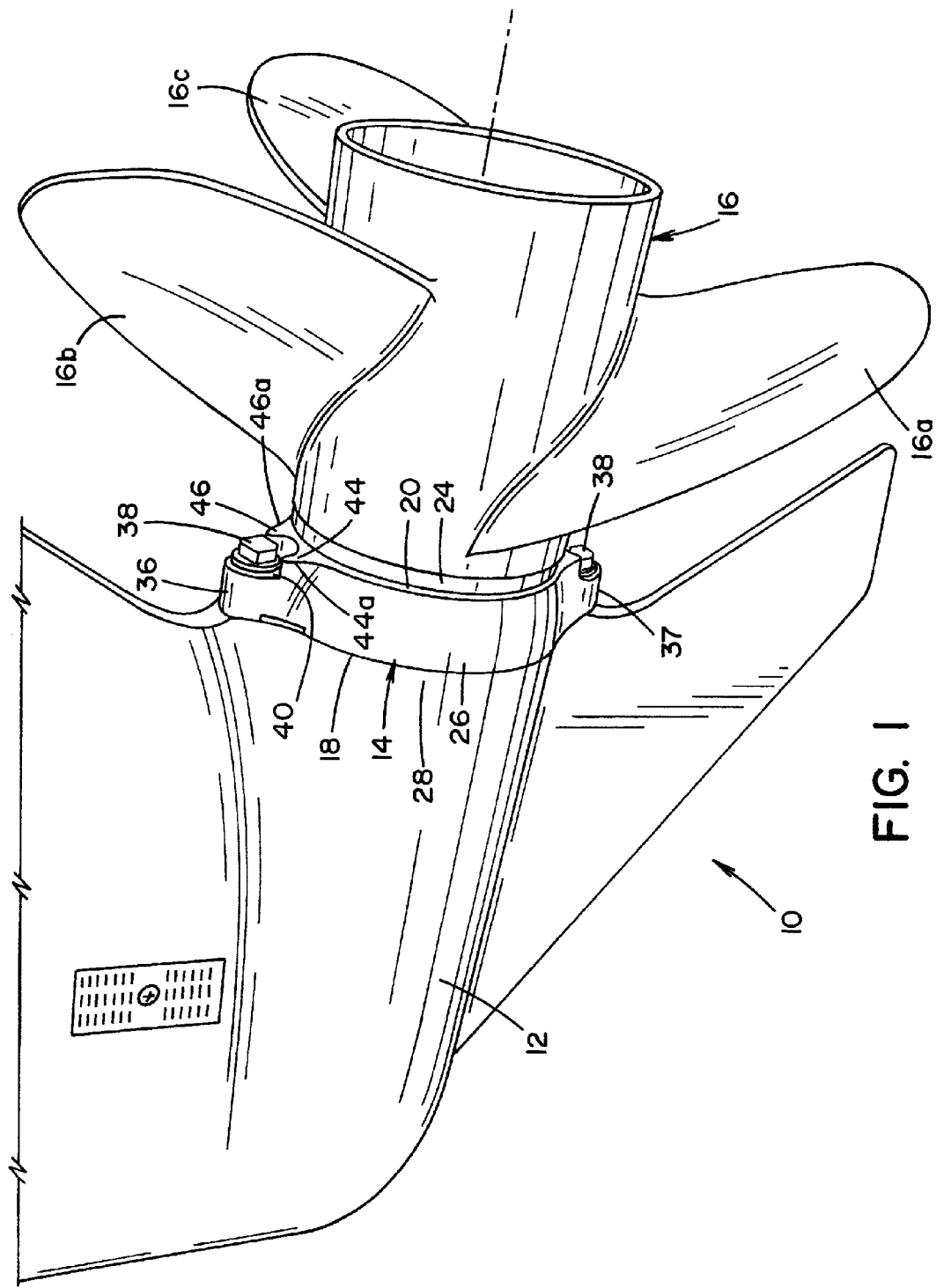
FIG. 1 is a partial perspective view of a prop shaft assembly including a gear casing, a prop shaft holder mounted to the gear casing and a propeller rotatably secured to the gear casing.
Figure 2:
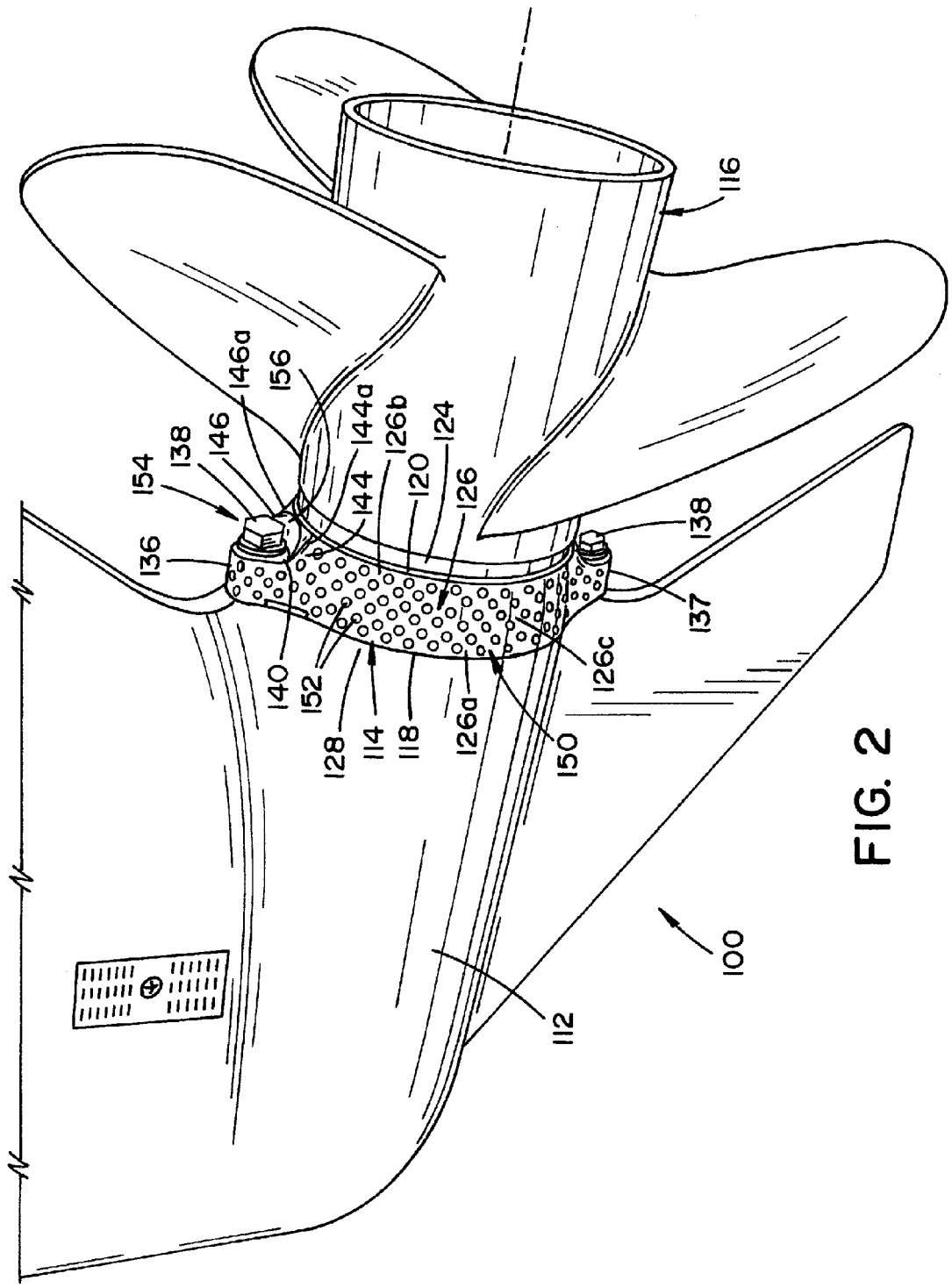
FIG. 2 is a partial perspective view of a prop shaft assembly similar to FIG. 1, but showing the prop shaft holder including a surface feature for reducing radial separation of water flow thereover.
Figure 3:
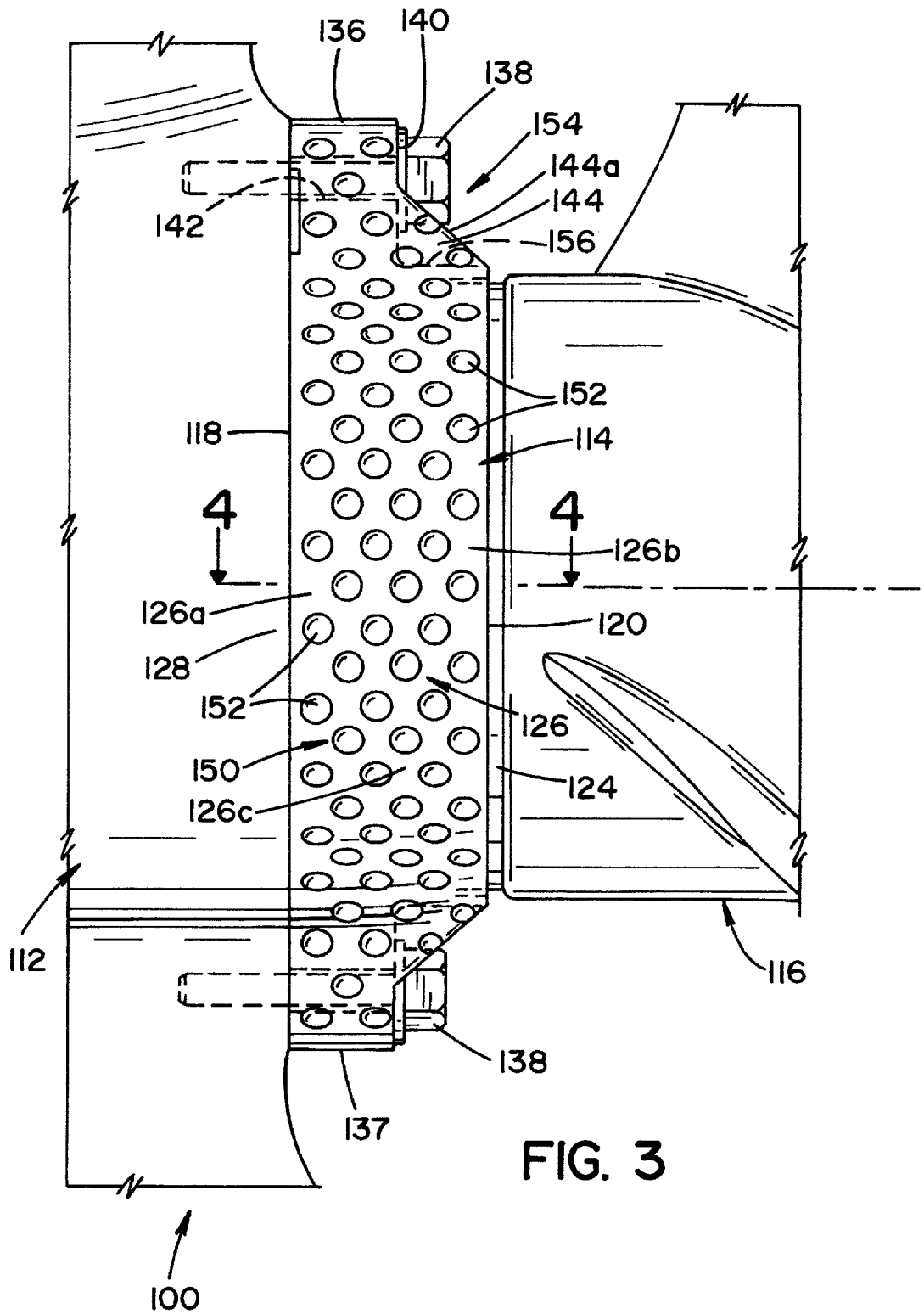
FIG. 3 is a side elevation view of the prop shaft assembly of FIG. 2.
Figure 4:
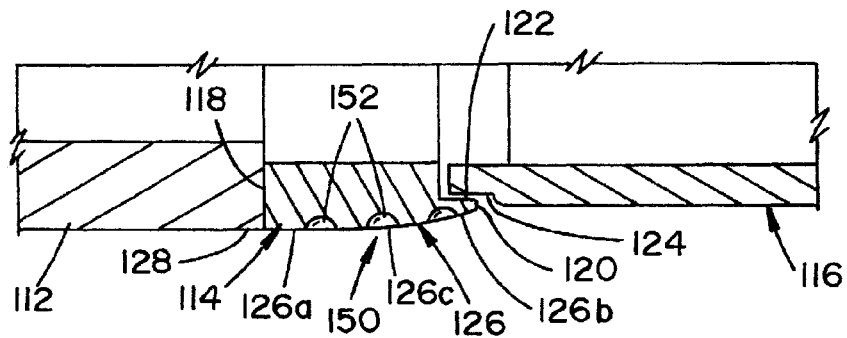
FIG. 4 is a cross-sectional view of the prop shaft assembly taken along the line 4-4 of FIG. 3.
Figure 5:
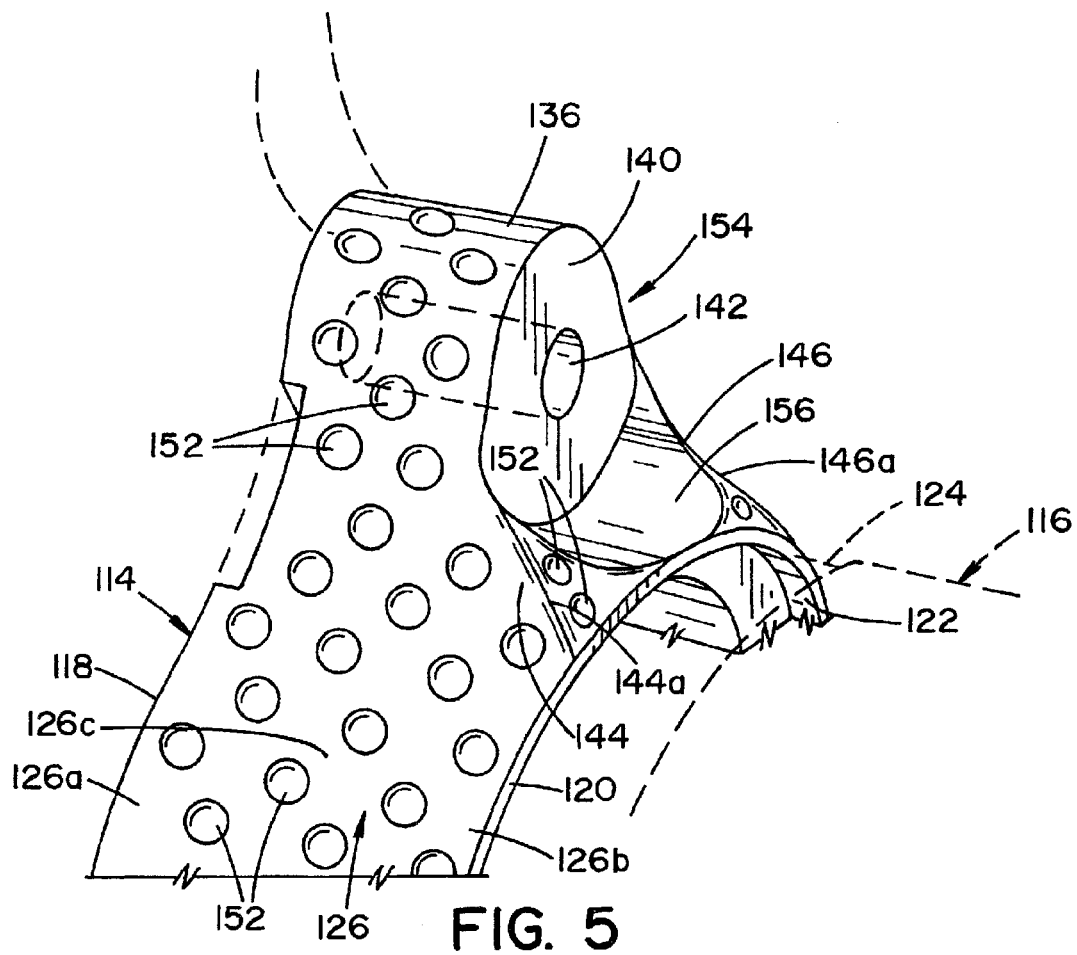
FIG. 5 is a partial enlarged perspective view of the prop shaft holder showing an upper protruding portion thereof.

Referring now to the drawings wherein the showings are for purposes of illustrating one or more exemplary embodiments and not for purposes of limiting same, FIGS. 1-4 depict a prop shaft assembly 10 for a marine application. In the illustrated embodiment, the prop shaft assembly 10 includes a gear casing 12 and a prop shaft holder 14 mounted to the gear casing 12. The prop shaft assembly 10 further includes a propeller 16 rotatably secured relative to the gear casing 12 via a propeller shaft (not shown). In this embodiment, the prop shaft holder 14 includes a forward end 18 for engaging the gear casing 12 and a rearward end 20 axially spaced apart from the forward end 18. The rearward end 20 includes an inner radial surface (not shown in FIG. 1) for engaging and/or cooperatively mating with an outer radial surface 24 of the propeller 16. The prop shaft holder 14 additionally includes a tapered surface 26 extending from the forward end 18 to the rearward end 20.

The need for the tapered surface 26 results from the outer radial surface 24 of the propeller 16 being spaced radially inward relative to an outer radial surface or surface portion 28 of the gear casing 12 adjacent the forward end 18. One problem with the embodiment of FIG. 1 is that paint erosion can occur along the tapered surface 26, particularly at a location between the forward and rearward ends 18, 20 at which tapering toward the rearward surface 20 begins. Such paint erosion provides an indication that water is separating from the prop shaft holder 14 at this point (i.e., the start of the taper of the tapered surface 26), leaving a low-pressure area behind that boils and causes surface cavitation. More particularly, the effect of the tapered surface 26 is that the laminar flow separates before it reaches the propeller 16, causing cavitation erosion of the paint at the separation point, and decreased propeller efficiency since the roots of the propeller blades 16a, 16b and 16c are now exposed to air instead of water.

As shown, the prop shaft holder 14 can further include an upper protruding portion 36 and a lower protruding portion 37, both for accommodating respective fasteners, such as illustrated bolts 38, that connect the forward end 18 of the prop shaft holder 14 to the gear casing 12. The lower protruding portion 37 can be the same as the upper protruding portion 36 except that the lower protruding portion 37 is vertically mirrored relative to the upper protruding portion 36. Accordingly, further details concerning the protruding portions 36, 37 will only be provided in connection with the upper protruding portion 36 but it is to be appreciated that all such details could be applicable to the lower protruding portion 37.

As shown at the protruding portion 36, the prop shaft holder 14 can additionally include a generally planar radial surface 40 defined by the protruding portion 36 at an axial position between the forward end 18 and the rearward end 20, an aperture (not shown) defined in the planar radial surface 40 for receipt of the fastener or bolt 38, and fastener covering portions 44, 46 defined axially between the planar radial surface 40 and the rearward end 20 for partially enclosing the fastener or bolt 38. Notably, the fastener covering portions 44, 46 of FIG. 1 include a sharp edge or apex 44a, 46a, respectively. Severe erosion was observed at or near the protruding portion 36 caused by low pressure at these edges 44a, 46a and resulted in surface cavitation.

With reference now to FIGS. 2-5, a prop shaft assembly 100 for a marine application is shown to one exemplary embodiment. The prop shaft assembly 100 includes a gear casing 112, a prop shaft holder 114 mounted to the gear casing 112, and a propeller 116 rotatably secured to the gear casing 112. In particular, though not shown but as will be appreciated and understood by those skilled in the art, the propeller 116 can be secured to a propeller shaft (not shown) that is housed within the gear casing 112 and supported by the prop shaft holder 114. As will be described in more detail below, the prop shaft holder 114 of the embodiment illustrated at FIGS. 2-5 includes a surface feature 150 for reducing radial separation of water flow thereover (i.e., transitions water flow from laminar to turbulent flow).

The prop shaft holder 114 of the embodiment illustrated in FIGS. 2-5 includes a forward end 118 for engaging the gear casing 112 (e.g., with gear casing 112 associated with an outboard motor, not shown) and a rearward end 120 axially spaced apart from the forward end 118. As shown, the rearward end 120 includes an inner radial surface 122 (FIG. 4) for engaging and/or cooperatively mating with an outer radial surface 124 of the propeller 116. Additionally, the prop shaft holder 114 includes a tapered surface 126 extending from the forward end 118 of the prop shaft holder 114 to the rearward end 120 of the prop shaft holder 114. In the illustrated embodiment, the tapered surface 126, which can also be referred to as a circumferential surface, includes the surface feature 150 thereon for inducing turbulent flow to water passing thereover (i.e., for imparting turbulent action to water flowing thereover).

In the embodiment illustrated, the surface feature 150 is a plurality of spaced apart dimples 152. In particular, the plurality of dimples 152 can be closely spaced together, as shown, and disposed about an entirety of the tapered surface 126 for causing water flow to adhere to the tapered surface 126. In particular, the plurality of dimples 152 can be spaced apart axially and radially about the tapered surface 126 and/or the prop shaft holder 114 generally. In one embodiment, the plurality of dimples 152 each have a diameter approximately 5-15% of an axial length of the prop shaft holder 114. The prop shaft axial length can be defined as the distance between the forward end 118 and the rearward end 120. In a more specific embodiment, the plurality of dimples 152 each have a diameter approximately 11% of the axial length of the prop shaft holder 114. In these same embodiment or in other embodiments, the plurality of dimples 152 each have a depth of approximately 2-4% of the axial length of the prop shaft holder 114. In a more specific embodiment, the plurality of dimples 152 each have a depth of approximately 3% of the axial length of the prop shaft holder 114. By way of example, the prop shaft holder 114 can have an axial length of 35 mm, though other lengths could be used.

The outer radial surface 124 of the propeller 116 is spaced radially inward relative to an outer radial surface 128 of the gear casing 112 adjacent the forward end 118, and likewise spaced radially inward relative to the tapered surface 126, particularly a portion thereof adjacent the forward end 118 of the prop shaft holder 116. As shown, the tapered surface 126 can narrow radially adjacent the rearward end 120 of the prop shaft holder 114. In particular, and with specific reference to FIG. 4, the tapered surface 126 can include a non-tapered surface portion 126a extending from the forward end 118 of the prop shaft holder 114 toward the rearward end 120 on the prop shaft holder 114 that is generally parallel to a center axis of the prop shaft holder 114.

The tapered surface 126 can additionally include a rearward tapered surface portion 126b disposed rearward of the forward surface portion 126a and extending from the forward surface portion 126a to the rearward end 120 of the prop shaft holder 114. A transition point or area 126c is defined between or at the intersection of the forward surface portion 126a and the rearward portion surface 126b. While there is generally very little or no taper along the forward surface portion 126a, the rearward surface portion 126b in contrast is configured with a radial taper such that a diameter of the rearward tapered surface portion 126b adjacent the forward surface portion 126a is greater than a diameter of the rearward tapered surface portion 126b adjacent the rearward end 120 of the prop shaft holder 114.

Additionally, the tapered surface 126 can define at least one fastener recess 154 for accommodating a fastener, such as bolt 138, that secures the prop shaft holder 114 to the gear casing 112. As will be described in more detail below, the fastener recess 154 can be further defined by a lower curved surface 156 disposed below the fastener or bolt 138. More specifically, in the illustrated embodiment, the prop shaft holder 114 can include upper and lower protruding portions 136, 137 for accommodating respective fasteners or bolts 138 that connect the forward end 118 of the prop shaft holder 114 to the gear casing 112. The lower protruding portion 137 can be the same as the upper protruding portion 136 except that it is vertically mirrored relative to the upper protruding portion 136. Accordingly, only the upper protruding portion 136 will be described in further detail herein but it is to be appreciated that details concerning the upper protruding portion 136 can apply to the lower protruding portion 137.

As shown, the upper protruding portion 136 defines a generally planar radial surface 140 at an axial position between the forward end 118 of the prop shaft holder 114 and the rearward end 120 of the prop shaft holder 114. An aperture 142 is defined in the planar radial surface 140 for receipt of the fastener or bolt 138. The prop shaft holder 114 can further include fastener covering portions 144, 146 defined between the planar radial surface 140 and the rearward end 120 of the prop shaft holder 114 for partially enclosing the fastener or bolt 138. As shown, the fastener covering portions 144, 146 define the curved surface 156 thereon and/or therebetween.

Unlike the embodiment illustrated in FIG. 1, the fastener covering portions 144, 146 each include a rounded apex portion 144a, 146a extending from the planar radial surface 140 to the rearward end 120 of the prop shaft holder 114. In particular, the rounded apex portions 144a, 146a are smooth transition surface portions that blend the tapered surface 126 and the lower curved surface 156. More specifically, each of the rounded apex portions 144a, 146a tapers radially inwardly along an axial extent thereof that extends from the planar radial surface 140 to the rearward end 120 of the prop shaft holder 114. As shown, the curved surface 156 blends into the tapered surface 126 by the rounded apex portion 144a or 146a of each of the fastener covering portions 144, 146.

As shown, the fastener covering portions 144, 146 can also include the surface feature for inducing turbulent flow from water passing thereover. The surface feature on the fastener covering portions 144, 146 can be referred to as an additional surface feature (i.e., in addition to the surface feature on the tapered surface 126). In the illustrated embodiment, the protruding portion and the fastener covering portions both include the additional surface feature for inducing turbulent flow to water passing thereover. In the illustrated embodiment, the surface feature and the additional surface feature area are the plurality of dimples 152, with the plurality of dimples 152 disposed about an entirety of at least the tapered surface 126 and part of the protruding portion 136 circumferentially surrounding the fastener recess 154 and on exterior sides of the fastener covering portions 144, 146.

Advantageously the inclusion of the plurality of dimples 152 effects water flow near the propeller 116. In particular, the plurality of dimples 152 cause water flow therealong to adhere longer to the surface, such as the tapered surface 126. This reduces or eliminates erosion and/or paint removal on the prop shaft holder 114. In addition, the rounded apex portions 144a and 146a, instead of the sharp edges 44a, 46a of FIG. 1, reduces a pressure differential at or near this area, which also has the effect of reducing or eliminating erosion and/or paint removal on a prop shaft holder 114. Also advantageous is that the imparting of turbulent flow to the water passing along and over the prop shaft holder 114 increases efficiency as water flow separates less before it reaches the propeller 116. Thus, increased propeller efficiency results from the prop shaft holder 114 as the attached flow provides more propeller blade area in contact with water. A further advantage is decreased drag, as turbulent attached flow has a lower coefficient of drag than laminar flow.

To apply the surface feature 150 to the prop shaft holder 114, any known technique could be used. In one embodiment of applying a plurality of dimples 152 to the prop shaft holder 114, a post-casting machine process could be used. Alternatively, a casting process with the dimples defined in one of the dies could be used. Other manufacturing processes and technique can also be used.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A prop shaft holder for an outboard motor, comprising:
   a forward end for engaging a gear casing of the outboard motor;
   a rearward end axially spaced apart from the forward end, the rearward end including an inner radial surface for engaging an outer radial surface of a propeller; and
   a tapered outer surface extending from the forward end to the rearward end, the tapered surface including a surface feature that induces turbulent flow to water passing thereover.

2. The prop shaft holder of claim 1 wherein the surface feature is a plurality of dimples defined in the tapered surface for causing water flow to adhere to the tapered surface.

3. The prop shaft holder of claim 2 wherein the plurality of dimples are spaced apart axially and radially about the tapered surface.

4. The prop shaft holder of claim 1 wherein the outer radial surface of the propeller is spaced radially inward relative to the tapered surface adjacent the forward end and to an outer radial surface of the gear casing adjacent the forward end.

5. The prop shaft holder of claim 1 further including:
   a protruding portion for accommodating a fastener that connects the forward end to the gear casing;
   a generally planar radial surface defined by the protruding portion at an axial position between the forward end and the rearward end;
   an aperture defined in the planar radial surface for receipt of the fastener; and fastener covering portions defined between the planar radial surface and the rearward end for partially enclosing the fastener, the fastener covering portions each including a rounded apex portion extending from the planar radial surface to the rearward end.

6. The prop shaft holder of claim 5 wherein the rounded apex portion tapers radially inwardly along an axial extent thereof that extends from the planar radial surface to the rearward end.

7. The prop shaft holder of claim 5 wherein the fastener covering portions define a curved surface disposed below the aperture, the curved surface blended into the tapered surface by the rounded apex portion of each of the fastener covering portions.

8. The prop shaft holder of claim 5 wherein the fastener covering portions include an additional surface feature for inducing turbulent flow to water passing thereover.

9. The prop shaft holder of claim 5 wherein the protruding portion and the fasteners covering portions Include an additional surface feature for inducing turbulent flow to water passing thereover.

10. The prop shaft holder of claim 9 wherein the surface feature and the additional surface feature are a plurality of dimples, the plurality of dimples disposed about an entirety of at least the tapered surface.

11. The prop shaft holder of claim 1 wherein the tapered surface includes:
    a forward surface portion extending from the forward end toward the rearward end that is generally parallel to a center axis of the prop shaft holder; and
    a rearward tapered surface portion disposed rearward of the forward surface portion and extending from the forward surface portion to the rearward end, the rearward tapered surface portion configured with a radial taper such that a diameter of the rearward tapered surface portion adjacent the forward surface portion is greater than a diameter of the rearward tapered surface portion adjacent the rearward end.

12. A prop shaft assembly for a marine application, comprising:
    a gear casing;
    a prop shaft holder mounted to the gear casing, the prop shaft holder including a surface feature for reducing radial separation of water flow thereover, wherein the prop shaft holder includes a tapered surface extending from a forward end of the prop shaft holder to a rearward end of the prop shaft holder, the tapered surface including the surface feature thereon; and
    a propeller rotatably secured to the gear casing.

13. The prop shaft assembly of claim 12 wherein the surface feature is a plurality of spaced apart dimples, the plurality of dimples closely spaced together and disposed about an entirety of the tapered surface.

14. The prop shaft assembly of claim 12 wherein the tapered surface narrows radially adjacent a rearward end of the prop shaft holder.

15. The prop shaft assembly of claim 12 wherein the tapered surface defines a fastener recess for accommodating a fastener that secures the prop shaft holder to the gear casing, the fastener recess further defined by a lower curved surface disposed below the fastener, wherein a smooth transition surface portion blends the tapered surface and the lower curved surface.

16. A prop shaft holder for an outboard motor in a marine application, comprising:
    a forward end that engages a gear casing of the outboard motor;
    a rearward end that engages a propeller operatively connected to the outboard motor for powered rotation thereof; and
    a circumferential surface extending between the forward and rearward ends and having a surface feature thereon for imparting turbulent action to water flowing thereover, wherein the surface feature is a plurality of small dimples disposed about an entirety of the circumferential surface.

17. The prop shaft assembly of claim 16 wherein each of the plurality of small dimples has a diameter approximately 5-15% of a distance between the forward end and the rearward end.

18. The prop shaft assembly of claim 16 wherein each of the plurality of small dimples has a depth approximately 2-4% of a distance between the forward end and the rearward end.

19. The prop shaft assembly of claim 17 wherein each of the plurality of small dimples has a diameter approximately 11% of a distance between the forward end and the rearward end.

20. The prop shaft assembly of claim 18 wherein each of the plurality of small dimples has a depth approximately 3% of a distance between the forward end and the rearward end.

* * * * *